(12) United States Patent
Ikegami et al.

(10) Patent No.: US 10,896,813 B2
(45) Date of Patent: Jan. 19, 2021

(54) ANALYSIS DATA PROCESSING METHOD AND DEVICE

(71) Applicant: Shimadzu Corporation, Kyoto (JP)

(72) Inventors: Masahiro Ikegami, Osaka (JP); Shigeki Kajihara, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 610 days.

(21) Appl. No.: 15/538,685

(22) PCT Filed: Dec. 22, 2014

(86) PCT No.: PCT/JP2014/083864
§ 371 (c)(1),
(2) Date: Jun. 22, 2017

(87) PCT Pub. No.: WO2016/103312
PCT Pub. Date: Jun. 30, 2016

(65) Prior Publication Data
US 2017/0352525 A1  Dec. 7, 2017

(51) Int. Cl.
*G01N 27/62* (2006.01)
*H01J 49/00* (2006.01)
(Continued)

(52) U.S. Cl.
CPC .......... *H01J 49/0036* (2013.01); *G01N 27/62* (2013.01); *G06K 9/0014* (2013.01);
(Continued)

(58) Field of Classification Search
CPC .. H01J 49/0036; H01J 49/0004; G01N 27/62; G06K 9/0014; G06K 9/00503; G06K 9/38; G06K 9/40
USPC ........................................................ 702/189
See application file for complete search history.

(56) References Cited

U.S. PATENT DOCUMENTS

2010/0260353 A1* 10/2010 Ozawa ................ G10L 21/0208
381/94.3
2012/0016598 A1 1/2012 Deininger et al.
(Continued)

FOREIGN PATENT DOCUMENTS

| CN | 104112643 A | 10/2014 |
|---|---|---|
| JP | 2797104 A2 | 10/2014 |

(Continued)

OTHER PUBLICATIONS

JP 2014215043, Ikegami et al., English translate, Nov. 2014, 31 pp. (Year: 2014).*

(Continued)

*Primary Examiner* — Toan M Le
*Assistant Examiner* — Xiuqin Sun
(74) *Attorney, Agent, or Firm* — Maier & Maier, PLLC

(57) ABSTRACT

When conducting imaging mass analysis for a region to be measured on a sample, an individual reference value calculating part obtains a maximum value in $P_i/I_i$ of respective measuring points, and stores the value together with measured data as an individual reference value. When performing comparison analysis for a plurality of the data obtained from different samples, a common reference value determining part reads out corresponding a plurality of the individual reference values and determines a minimum value as a common reference value Fmin. A normalization calculation processing part normalizes the respective intensity values by multiplying the intensity values read out from an external memory device by a normalization coefficient long_Max×(Fmin/$P_i$) obtained from the common reference value Fmin, TIC values Pi at the respective measuring points, and a maximum allowable value long_Max of a variable storing the intensity values at the time of operation.

16 Claims, 5 Drawing Sheets

(51) Int. Cl.
*G06K 9/00* (2006.01)
*G06K 9/38* (2006.01)
*G06K 9/40* (2006.01)

(52) U.S. Cl.
CPC .......... *G06K 9/00503* (2013.01); *G06K 9/38* (2013.01); *G06K 9/40* (2013.01); *H01J 49/0004* (2013.01)

(56) References Cited

U.S. PATENT DOCUMENTS

2013/0035867 A1* 2/2013 De Moor ............... G06K 9/38 702/19
2014/0316717 A1 10/2014 Ikegami et al.

FOREIGN PATENT DOCUMENTS

| JP | 2014-215043 A | | 11/2014 | | |
|----|---------------|---|---------|---|---|
| JP | 2014215043 A | * | 11/2014 | ............ | H01J 9/0004 |

OTHER PUBLICATIONS

International Search Report and Written Opinion dated Jan. 27, 2015 from corresponding International Application No. PCT/JP2014/083864; 7 pgs.
"IMScope TRIO imaging mass microscopy" Shimadzu Corporation, Searched on Dec. 5, 2014, Internet URL: http://www.an.shimadzu.co.jp/bio/imscope/index.htm, 3 pgs.
Y. Sugiura et al (six), "Visualization of the cell-selective distribution of PUFA-containing phosphatidylcholines in mouse brain by imaging mass spectrometry" Journal of Lipid Research, vol. 50, 2009, pp. 1766-1788., 23 pgs.
English-language translation of Written Opinion dated Jan. 27, 2015 in corresponding International application No. PCT/JP2014/083864; 7 pages.
International Preliminary Report on Patentability dated Jun. 27, 2017 in corresponding International application No. PCT/JP2014/083864; 8 pages.
Office Action dated Apr. 24, 2018 in corresponding Japanese Application No. 2016-565611; 6 pages.

* cited by examiner

ANALYSIS DATA PROCESSING METHOD AND DEVICE

TECHNICAL FIELD

The present invention relates to a method and an apparatus for processing data acquired by an analyzing device and, more specifically, to a method and an apparatus for processing data acquired by an analyzing device capable of conducting predetermined analyses on a number of measuring points in a two-dimensional region on a sample, and acquiring data relating to the sample near the measuring points. In the present invention, analyzing devices configured to acquire data to be processed include, for example, an imaging analyzing device, a Fourier transform infrared spectrophotometric measurement (FTIR) imaging device, a Raman spectroscopic imaging device, an electron beam microanalyser (EPMA), a scanning type electron microscope/energy dispersion type X-ray analyzing device (SEM/EDS), scanning type probe microscope (SPM), and the like.

BACKGROUND ART

Mass analysis imaging is a method of inspecting distribution of substances having a specific mass by conducting mass analysis for each of a plurality of measuring points (minute regions) in a two-dimensional region of a sample such as a slice of biotissue, and applications to drug, biomarker search, cause investigation for various diseases and maladies, and the like are in progress. A mass analyzing device for performing the mass analysis imaging is generally referred to as an imaging mass analyzing device (see Non-Patent Literature 1, etc.). It may also be referred to generally as a microscopic mass analyzing device or as a mass microscopy because it executes imaging mass analysis on the region to be analyzed determined based on a microscopic observation image obtained by conducting microscopic observation on a given two-dimensional region on a sample. However, in this specification, it is referred to as "an imaging mass analyzing device".

FIG. 5 is a schematic explanatory drawing illustrating data obtained by the imaging mass analyzing device and an imaging image display based on the obtained data. The imaging mass analyzing device acquires mass spectrum data which indicates a relationship between a mass charge ratio in a range of a predetermined mass charge ratio m/z range and an intensity value (ion intensity value) at each of a number of measuring points (minute regions) 102 set in a two-dimensional region to be measured 101 on a sample 100. In this specification, a set of mass spectrum data acquired from all the measuring points in the region to be measured is referred to as mass analysis imaging data.

When observation of two-dimensional distribution of a component having a specific mass based on the mass analysis imaging data collected in this manner is decided, an analyst instructs preparation and display of imaging images at a mass charge ratio (m/r=$M_1$ in an example illustrated in FIG. 5). Accordingly, intensity values at m/s=$M_1$ are extracted from the mass spectra acquired at the respective measuring points 102, and pixels indicating the intensity values by a color scale or a gray scale are arranged in one-to-one correspondence with biaxial positions, that is, of an x-axis and a y-axis, of the respective measuring points 102, so that a desired mapping image, that is, a mass analysis imaging image is created. The mass analysis imaging images by a number corresponding to the number of data points in a direction of the mass charge ratio may be created from one mass analysis imaging data.

A matrix-supporting laser desorption ionization (MALDI) ion source normally used for the imaging mass analyzing device employs an ionization method suitable for biological samples and the like. However, ion intensities vary relatively considerably from one measurement to another (that is, for each time of laser beam irradiation). Therefore, a plurality of times of measurement are generally performed repeatedly, and ion intensity signals acquired respectively by measurements performed by the plurality of times are integrated for acquiring a mass spectrum for one measuring point. However, such an integration of the signals may not solve influences of variations in ion intensity among measuring points satisfactorily. Therefore, even when the imaging images are created from the intensity values for specific mass charge ratios acquired at the respective measuring points, the distribution of the substance may not be accurately reflected. Therefore, when creating imaging images, a normalized intensity value is often used according to a predetermined standard instead of using the intensity values at the respective measuring points.

For example, Non-Patent Literature 2 describes that performing preparation and display of imaging images or performing statistical analysis after TIC normalization or XIC normalization has performed on mass analysis imaging data acquired from one sample is effective. TIC, being an abbreviation of "Total Ion Current", is a sum of ion intensity values within a total mass charge ratio range in mass spectra acquired at the respective measuring points. When TIC normalization is performed, the intensity values at the respective mass charge ratios are normalized so that the TCIs at the respective measuring points are equalized. In contrast, XIC, being an abbreviation of "Extract Ion Current", is a sum of ion intensity values in a specific mass charge ratio or a specific mass charge ratio range in the mass spectra acquired by the respective measuring points. When XIC normalization is performed, the intensity values at the respective mass charge ratios are normalized so that the XICs at the respective measuring points are equalized, so that the height of all the peaks in, for example, the specific mass charge ratios between measuring points may be equalized. Although Patent Literature 2 discloses normalization of the intensify values of the mass spectra based on a p-norm which is an expanded normalization based on TIC standard, it is also normalization based on an intensity value at one peak or a sum of intensity values at a plurality of peaks appearing in the mass spectra.

An analysis of samples using the imaging mass analysis is based on strong demands of determination of presence or absence of specific components by comparing mass analysis imaging data acquired respectively from a plurality of the samples, determination of similarity of space distribution of such components, or quantitative comparison to some extent of contained amounts of such components. A plurality of mass analysis imaging data which are desired to be compared may be measured at different times and dates, or may be measured under different measurement conditions in many cases. With the imaging mass analyzing device, intensity values of signals acquired thereby tend to vary considerably depending on various causes such as an irradiation diameter of a laser beam from MALDI ion source, energy of the laser beam, ion draw-out voltages from the ion source in the vicinity of a surface of a sample, an voltage applied in an ion detector, and, in addition, types of the samples, and difference in preprocessing conditions. Therefore, in order to compare the mass analysis imaging data obtained respectively from the plurality of samples accurately, the intensity values among these data need to be normalized according to the same standard.

However, the methods of normalization of the related art described above are designed for performing normalization with reference to maximum values of TIC and XIC in the respective mass analysis imaging data, and thus a common reference value which can normalize the plurality of mass analysis imaging data adequately cannot be obtained. Although the analyst may determine the common reference value as needed and perform normalization based on the determined reference value, if the reference value is not adequate, data overflow or significant round-off errors may occur at the time of normalization operation.

In other words, when performing the normalization operation as described above on a computer, the intensity values acquired by mass analysis are normally stored in variables having a predetermined bit length such as 16 bit and 32 bit, and thus have a limited dynamic range. Therefore, if the reference value of normalization is too large, part of the intensity values becomes to large due to the normalization, so that an overflow may occur. In contrast, when the reference value of normalization is too small, large round-off errors occur in intensity values after normalization, and thus deterioration in accuracy of analysis may result. In order to avoid such events, it is important to set a common reference value, which serves as a reference at the time of normalization, adequately.

One of methods for normalizing the plurality of mass analysis imaging data adequately without obtaining the common reference value for normalization as described above includes a data processing method described in Patent Literature 1. In this data processing method, the plurality of mass analysis imaging data to be compared are spatially combined to allow handling the plurality of mass analysis imaging data as one mass analysis imaging data. In order to combine the data, data interpolation is performed so as to equalize a spatial resolution in the plurality of mass analysis imaging data (that is, a size of one measuring point or intervals) and a mass resolution. Subsequently, TIC normalization or XIC normalization is performed on the combined single mass analysis imaging data to correct the intensity values at the respective measuring points.

However, when normalization is performed simply with reference to a maximum value of the TIC or XIC, an overflow in normalization operation may occur. Accordingly, in the data processing method described in Patent Literature 1, scaling process which multiples the intensity values at all the measuring points by a constant smaller than 1 in order not to exceeds the maximum allowable value of the variables in which the intensity values are stored is performed simultaneously with normalization, so that the overflow is avoided.

CITATION LIST

Patent Literature

PTL 1: JP-A-2014-2155043
PTL 2: Specification of U.S. Patent Serial No. 2012/0016598.

Non-Patent Literature

NPTL 1: "iMScope TRIO imaging mass microscopy" Shimadzu Corporation [searched on Dec. 5, 2014, Internet URL: http://www.an.shimadzu.co.jp/bio/imscope/index.htm NPTL 2: Y. Sugiura et al (six), "Visualization of the cell-selective distribution of PUFA-containing phosphatidylcholines in mouse brain by imaging mass spectrometry" Journal of Lipid Research, Vol, 50, 2009, pp. 1766-1788.

SUMMARY OF INVENTION

Technical Problem

The data processing method described in PTL 1 described above is one of superior methods which can normalize a plurality of mass analysis imaging data to be compared adequately. However, time is required for combining the plurality of mass analysis imaging data. The time required for this processing is increased with increase in mass resolution or spatial resolution of the mass analysis imaging data and with increase in data size. In addition, in order to perform such processing in a short time, a computer having a high performance may be required. In addition, in the method described above, normalization is performed in conformity to the maximum value in the combined data. Therefore, normalization cannot be performed under the same standard between data which are not combined. When the spatial resolution and the mass resolution need to be equalized among the plurality of mass analysis imaging data, the combining processing as described above is effective. However, when the spatial resolution and the like need not to be equalized and simpler and more efficient comparison of the plurality of mass analysis imaging data is desired, normalization of the intensity values in the plurality of mass analysis imaging data needs to be performed efficiently with a simpler process.

The same problem applies not only in the imaging mass analyzing device, but also in other analyzing devices in which data ate collected by performing analysis at a number of measuring points on a sample respectively. Examples of the analyzing devices described above include, for example, an FTIR imaging device configured to acquire infrared absorption spectra by Fourier transform infrared spectrophotometric measurement at a number of measuring points on a sample respectively, a Raman spectroscopic imaging device configured to acquired Raman scattering spectra by a Raman spectroscopy at a number of measuring points on a sample, an electron beam microanalyser, scanning type electron microscope/an energy dispersion type X-ray analyzing device configured to acquire spectra which indicates relationships between energy and intensity of a characteristic X-ray emitted from a sample upon electron beam excitation at a number of the measuring points on the sample, and a scanning probe microscope configured to measure a force acting on a probe while changing a distance between the probe and a sample at a number of the measuring points on the sample and acquire spectra which indicates a relationship between a height from the surface of the sample and physical property data such as spectra (force curve) indicating a relationship between a distance between the probe and the sample and a force applied to the probe, or to measure a current flowing in the probe instead of a bias voltage of the sample and acquire a current-voltage characteristic (I-V curve).

In view of such a problem described above, it is an object of the present invention mainly to enable normalization of intensity values among a plurality of analytic data efficiently in a simple process without performing combining processing for a plurality of analytic data as in the related art in order to achieve simple and efficient comparison of the plurality of analytic data acquired respectively, for example, from different samples by an analyzing device such as an imaging mass analyzing device.

Means For Solving the Problem

A first mode of an analytical data processing method of the present invention for solving the above-described problem is an analytical data processing method that handles a spectrum data set including spectrum data collected by performing predetermined analyses respectively on a plurality of the measuring points in a predetermined region to be measured set on the sample and indicating a relationship between a predetermined parameter and a signal intensity value, being associated with spatial position information of measuring points, the method including: for a plurality of spectrum data sets different from each other, a) an individual reference value acquiring step for obtaining a reference value at which intensity values after the normalization do not exceed a predetermined allowable value when normalizing intensity values for all or part of parameter values in spectrum data at respective measuring points based on the reference value for each of spectrum data sets;

b) a common reference value selecting step for selecting a minimum reference value from a plurality of the reference values obtained in the individual reference value acquiring step as a common reference value or setting a value smaller than the minimum value as the common reference value for all the spectrum data sets; and c) a normalization executing step for normalizing the intensity values for all or part of the parameter values in the spectrum data contained in each of the spectrum data sets based on the common reference value selected in the common reference value selecting step.

A second mode of an analytical data processing method of the present invention for solving the above-described problem is an analytical data processing method that handles a spectrum data set including spectrum data collected by performing predetermined analyses respectively on a plurality of the measuring points in a predetermined region to be measured set on the sample and indicating a relationship between a predetermined parameter and a signal intensity value, being associated with spatial position information of measuring points, the method including: for the plurality of spectrum data sets different from each other, a) an individual reference value acquiring step for obtaining a value at which the ratio between an integrated value for the intensity value and a maximum intensity value for all or part of the parameter values in a spectrum data at one measuring point becomes the largest among those at all the measuring points as a reference value for normalization for each of the spectrum data sets;

b) a common reference value selecting step for selecting a minimum reference value from the plurality of reference values obtained in the individual reference value acquiring step as a common reference value or setting a value smaller than the minimum value as the common reference value for all the spectrum data sets; and c) a normalization executing step for normalizing intensity values for all or part of the parameter values in the spectrum data included in each of the spectrum data sets so that intensity values after normalization do not exceed a predetermined allowable value based on the common reference value selected in the common reference value selecting step.

The first mode of the analytical data processing apparatus according to the present invention for solving the above-described problem is an apparatus for executing the first mode of the analytical data processing method according to the present invention, and an analytical data processing apparatus that handles a spectrum data set including spectrum data collected by performing predetermined analyses respectively on a plurality of the measuring points in a predetermined region to be measured set on the sample and indicating a relationship between a predetermined parameter and a signal intensity value, being associated with spatial position information of measuring points, the apparatus including: for the plurality of spectrum data sets different from each other, a) an individual reference value acquiring part for obtaining a reference value at which intensity values after the normalization do not exceed a predetermined allowable value when normalizing intensity values for all or part of parameter values in spectrum data at respective measuring points based on the reference value for each of spectrum data sets;

b) a common reference value selecting part for selecting a minimum reference value from the plurality of reference values obtained by the individual reference value acquiring part as a common reference value or setting a value smaller than the minimum value as the common reference value for all the spectrum data sets; and c) a normalization executing part for normalizing the intensity values for all or part of the parameter values in the spectrum data contained in each of the spectrum data sets based on the common reference value selected by the common reference value selecting part.

The second mode of the analytical data processing apparatus according to the present invention for solving the above-described problem is an apparatus for executing the second mode of the analytical data processing method according to the present invention, and an analytical data processing apparatus that handles a spectrum data set including spectrum data collected by performing predetermined analyses respectively on a plurality of the measuring points in a predetermined region to be measured set on the sample and indicating a relationship between a predetermined parameter and a signal intensity value, being associated with spatial position information of measuring points, the apparatus including: for the plurality of spectrum, data sets different from each other, a) an individual reference value acquiring part for obtaining a value at which the ratio between an integrated value for the intensity value and a maximum intensity value for all or part of the parameter values in a spectrum data at one measuring point becomes the largest among those at all the measuring points as a reference value for normalization for each of the spectrum data sets;

b) a common reference value selecting part for selecting a minimum reference value from the plurality of reference values obtained by the individual reference value acquiring part as a common reference value or setting a value smaller than the minimum value as the common reference value for all the spectrum data sets; and c) a normalization executing part for normalizing intensity values for all or part of the parameter values in the spectrum data included in each of the spectrum data sets so that intensity values after normalization do not exceed a predetermined allowable value based on the common reference value selected by the common reference value selecting part.

The analytical data processing method and apparatus of the present invention are configured to process data obtained by analyzing device including, for example, an imaging mass analyzing device, a Fourier transform infrared spectrophotometric measurement, a Raman spectroscopic imaging device, an electron beam microanalyser, a scanning type electron microscope/energy dispersion type X-ray analyzing device, and a scanning probe microscope.

When the analyzing device is an imaging mass analyzing device, the above-described "predetermined parameter" includes a mass charge ratio, and the spectrum data is a mass spectrum data indicating a relationship between the mass charge ratio and the ion intensity value. However, in a flight time type mass analyzing device, the mass spectra is created by creating a flight time spectrum indicating a relationship between a flight time and an ion intensity value, and then converting the flight time of each ion on the flight time spectrum into the mass charge ratio. Therefore, "mass spectrum data" may include "fight time spectrum data" indicated by the fight time before being converted into the mass charge ratio.

When the analyzing device is the Fourier transform infrared spectrophotometric measurement or the Raman spectroscopic imaging device, the above-described "predetermined parameter" includes a wave number or an inverse of the wavelength of a light, and the spectrum data includes infrared absorption spectrum data, the infrared reflection spectrum data, or the Raman scattering spectrum data. In the case where the analyzing device is the electron beam microanalyser, the scanning type electron microscope/energy dispersion type X-ray analyzing device, the above-described "predetermined parameter" is wavelength or energy of an X-ray, and the spectrum data is a spectrum data of the characteristic X-ray spectrum data. In the case where the analyzing device is the scanning probe microscope, the above-described "predetermined parameter" is a height of the probe from the surface of the sample or a bias voltage applied to the sample, and the spectrum data is a force curve indicating a relationship between a distance between the surface of the sample and the probe and a force applied to the probe or a current-voltage curve indicating a relationship between the above-described bias voltage and a current flowing in the probe.

In the analytical data processing method and apparatus of the present invention, a method of normalization is, for example, the above-described TIC normalization, the XIC normalization, or normalization based on the p-norm reference. As a matter of course, the reference values for normalization differ depending on the methods of normalization, and the intensity values in the spectrum data used for obtaining the reference values also differ correspondingly. In other words, in the case of performing the TIC normalization, for example, an integrated intensity value for all the parameter values in the spectrum data is used for obtaining the reference value, and in the case of per forming the XIC normalization, an intensity value for a specific parameter value in the spectrum data or integrated intensity values for a plurality of the parameter values included in a predetermined parameter value range are used.

According to the analytical data processing method of the first mode of the present invention implemented by the analytical data processing apparatus according to the first mode of the present invention, in the individual reference value acquiring step, the reference value at which intensity values after the normalization do not exceed a predetermined allowable value when normalizing intensity values for, for example, all of parameter values in spectrum data at respective measuring points included in each of spectrum data sets is obtained. Subsequently, respective reference values are obtained in the same manner for the plurality of spectrum data sets for which comparison analysis is desired, for example.

As used herein the term "predetermined allowable value" is intended to include typically the maximum value that a variable storing intensity values may take when executing normalization operation by a computer, that is, the maximum value that can guarantee that no overflow of data occurs during operation by the computer. In this case, when the intensity values in the plurality of spectrum data included in one spectrum data set are normalized based on the reference value obtained in the individual reference value acquiring step, overflow at the time of normalization operation is reliably avoided. The round-off errors at the time of operation may also be minimized.

Since the reference values obtained for the plurality of spectrum data sets are different from each other, in the common, reference value selecting step, the minimum reference value is selected from the plurality of reference values as a common reference value, or a value smaller than the minimum value is set as the common reference value. This is a reference value which guarantees that the intensity values to be normalized included in all the spectrum data sets do not cause overflow at the time of normalization operation. However, since the round-off errors increase as the reference value reduces, the minimum value in the plurality of reference values is preferably selected rather than selecting a value smaller than the minimum value as the common reference value.

In the normalization executing step, the intensity values for all or part of the parameter values in the spectrum data contained in each of the plurality of spectrum data included in each of the plurality of spectrum data sets are normalized based on the common reference value described above. Consequently, for example, the intensity values maybe corrected so that the TIC values are equalized according to the same reference at all the measuring points in the plurality of spectrum data sets. The round-off errors may also be minimized while avoiding occurrence of overflow at the time of operation. Therefore, normalization of the intensity values among the different spectrum data sets is achieved with high degree of accuracy, and accurate comparison among the spectrum data sets is achieved.

The analytical data processing method and apparatus of the first mode of the present invention is subject to the condition that the intensity values after normalization do not exceed a predetermined allowable value when obtaining the reference value for normalization for each of the spectrum data sets. In other words, if normalization based on the reference value is performed, overflow of the intensity values to be normalized included in at least one of the spectrum data sets does not occur. In contrast, the analytical data processing method and apparatus of the second mode of the present invention are not subject to the condition that the intensity values after normalization do not exceed a predetermined allowable value when obtaining the reference value for normalization for each of the spectrum data sets. Therefore, if normalization is simply performed based on the reference value obtained in this manner, the intensity values to be normalized included in the one spectrum data set are normalized adequately so as to meet the reference value, but overflow may occur in operation. The same applies to the case where the common reference value selected in the common reference value selecting step is used.

Accordingly, the analytical data processing method and apparatus of the second mode of the present invention perform an arithmetic processing for normalization being subject to the condition that the intensity values after normalization do not exceed a predetermined allowable value when normalizing the respective intensity values in the normalization executing step. Therefore, even with the analytical data processing method and apparatus of the second mode of the present invention in the same manner as the analytical data processing method and apparatus of the first mode of the present invention described above, the round-off errors may be minimized while avoiding occurrence of overflow at the time of the normalization operation. In addition, for example, the intensity values may be corrected so that the TIC values are equalized according to the same reference at all the measuring points in the plurality of spectrum data sets, and accurate comparison between the spectrum data sets is achieved.

In both of the analytical data processing methods and apparatuses of the first mode and the second mode of the present invention, acquisition of the reference value for each of the spectrum data sets in the individual reference value acquiring step may be performed, for example, when the analyst specifies the plurality of spectrum data sets for which comparison analysis is desired and thus normalization among the plurality of spectrum data sets is necessary. However, in order to acquire the reference value, many data need to be read out from an external memory device in which the spectrum data sets are stored, and hence a certain extent of time is required for this processing. In addition, executing the processing for obtaining the reference value as described above every time when the comparison analysis is performed is also waste of time.

The reference value for normalization for one spectrum data set, depending on the intensity values of the data, is determined unambiguously when the intensity values are determined. Accordingly, acquisition of the reference value does not necessarily have to be performed immediately before normalization, and may be performed any time after a time point when the data is acquired by measurement.

Accordingly, in the analytical data processing method of the present invention, preferably, the individual reference value acquiring step may be configured to be performed when spectrum data included in the spectrum data set is collected by executing the predetermined analyses for the plurality of measuring points in the predetermined region to be measured. The reference value obtained, in this manner, for example, may be stored in the same data file as the data obtained by measurement or in a different file associated with the data file.

Accordingly, when normalizing the data included in the plurality of spectrum data sets, individual reference value does not have to be calculated again, and hence time required for that maybe shortened and efficient normalization processing may be performed.

In addition, as described above, the round-off errors is increased as the reference value for normalization decrease. However, there is a case where a user wants to be involved in determination of the common reference value instead of determining the common reference value automatically without intermediary of the user. Therefore, in the analytical data processing method of the present invention, in the common reference value selecting step described above, a configuration in which the plurality of reference values acquired in the individual reference value acquiring step for all the spectrum data sets are presented to the user and the value according to the user instruction based on presented information is set as a common reference value is also applicable.

In the analytical data processing method and the apparatus according to the first and second mode of the present invention, data processing is performed for the plurality of spectrum data sets such as the mass analysis imaging data obtained respectively from the plurality of samples. However, the same processing may be performed for the mass analysis imaging data obtained from one sample, that is, for the spectrum data at the plurality of measuring points on the sample.

In other words, a third mode of an analytical data processing method of the present invention is an analytical data processing method that handles a data including spectrum data collected by performing predetermined analyses respectively on a plurality of the measuring points in a predetermined region to be measured set on the sample and indicating a relationship between a predetermined parameter and a signal intensity value, being associated with spatial position information of measuring points, the method including:

a) an individual reference value acquiring step for obtaining a reference value at which intensity values after the normalization do not exceed a predetermined allowable value when normalizing the intensity values for all or part of parameter values in spectrum data at one measuring point for each of the measuring points;

b) a common reference value selecting step for selecting the minimum reference value from the plurality of reference values for the spectrum data at the respective measuring points obtained in the individual reference value acquiring step as a common reference value or setting a value smaller than the minimum value as the common reference value; and c) a normalization executing step for normalizing the intensity values for all or part of the parameter values in the respective spectrum data based on the common reference value selected in the common reference value selecting step.

The third mode of the analytical data processing apparatus of the present invention is an apparatus for performing the third mode of the analytical data processing method of the present invention, and is the analytical data processing apparatus that handles a data including spectrum data collected by performing predetermined analyses respectively on a plurality of the measuring points in a predetermined region to be measured set on the sample and indicating a relationship between a predetermined parameter and a signal intensity value, being associated with spatial position information of measuring points, the apparatus including:

a) an individual reference value acquiring part for obtaining a reference value at which intensity values after the normalization do not exceed a predetermined allowable value when normalizing the intensity values for all or part of the parameter values in spectrum data at one measuring point for each of the measuring points based on the reference value;

b) a common reference value selecting part for selecting the minimum reference value from the plurality of reference values for the spectrum data at the respective measuring points obtained in the individual reference value acquiring part as a common reference value or setting a value smaller than the minimum value as the common reference value; and c) a normalization executing part for normalizing the intensity values for all or part of the parameter values in the respective spectrum data based on the common reference value selected by the common reference value selecting part.

A fourth mode of an analytical data processing method of the present invention is an analytical data processing method that handles a data including spectrum data collected by performing predetermined analyses respectively on a plurality of the measuring points in a predetermined region to be measured set on the sample and indicating a relationship between a predetermined parameter and a signal intensity value, being associated with spatial position information of measuring points, the method including:

a) an individual reference value acquiring step for obtaining a value at which the ratio between an integrated value for the intensity value and the maximum intensity value for all or part of the parameter values in spectrum data at one measuring point becomes the largest among those at all the measuring points as a reference value for normalization for each of the measuring points;

b) a common reference value selecting step for selecting the minimum reference value from the plurality of reference values for the spectrum data at the respective measuring points obtained in the individual reference value acquiring step as a common reference value or setting a value smaller than the minimum value as the common reference value; and c) a normalization executing step for normalizing the intensity values for all or part of the parameter values in the respective spectrum data so that the intensity values after normalization do not exceed a predetermined allowable value based on the common reference value selected in the common reference value selecting step.

The fourth mode of the analytical data processing apparatus of the present invention is an apparatus for performing the fourth mode of the analytical data processing method of the present invention, and is the analytical data processing apparatus that handles a data including spectrum data collected by performing predetermined analyses respectively on a plurality of the measuring points in a predetermined region to be measured set on the sample and indicating a relationship between a predetermined parameter and a signal intensity value, being associated with spatial position information of measuring points, the apparatus including:

a) an individual reference value acquiring part for obtaining a value at which the ratio between an integrated value for the intensity value and the maximum intensity value for all or part of the parameter values in spectrum data at one measuring point becomes the largest among those at all the measuring points as a reference value for normalization for each of the measuring points;

b) a common reference value selecting part for selecting the minimum reference value from the plurality of reference values for the spectrum data at the respective measuring points obtained in the individual reference value acquiring part as a common reference value or setting a value smaller than the minimum value as the common reference value; and c) a normalization executing part for normalizing intensity values for all or part of the parameter values in the respective spectrum data so that intensity values after normalization do not exceed a predetermined allowable value based on the common reference value selected in the common reference value selecting part.

Advantageous Effects of Invention

According to the analytical data processing method and apparatus of the present invention, when comparison of analytic data acquired respectively from, for example, a plurality of samples are desired, the required data may be normalized and compared as-is without combining data to be compared as in a method of the related art. Therefore, time required for unnecessary processing such as combining the data is no longer necessary, and thus comparison analysis may be proceeded efficiently. According to the analytical data processing method and apparatus of the present invention, dynamic range of variable used for operation may be used effectively, so that the round-off errors may be reduced while avoiding occurrence of overflow at the time of operation in normalization. Accordingly, accuracy of normalization of the intensity values among the different spectrum data seta is improved, and accurate comparison analysis among the spectrum data sets is achieved. Furthermore, a bit length of the variable does not have to be long meaninglessly, and hence effective usage of the resource of the computer may be achieved.

DESCRIPTION OF EMBODIMENTS

Hereinafter, an analytical data processing method and apparatus of the present invention will be described with an example of mass analysis imaging data acquired by an imaging mass analyzing device.

Figure 4:
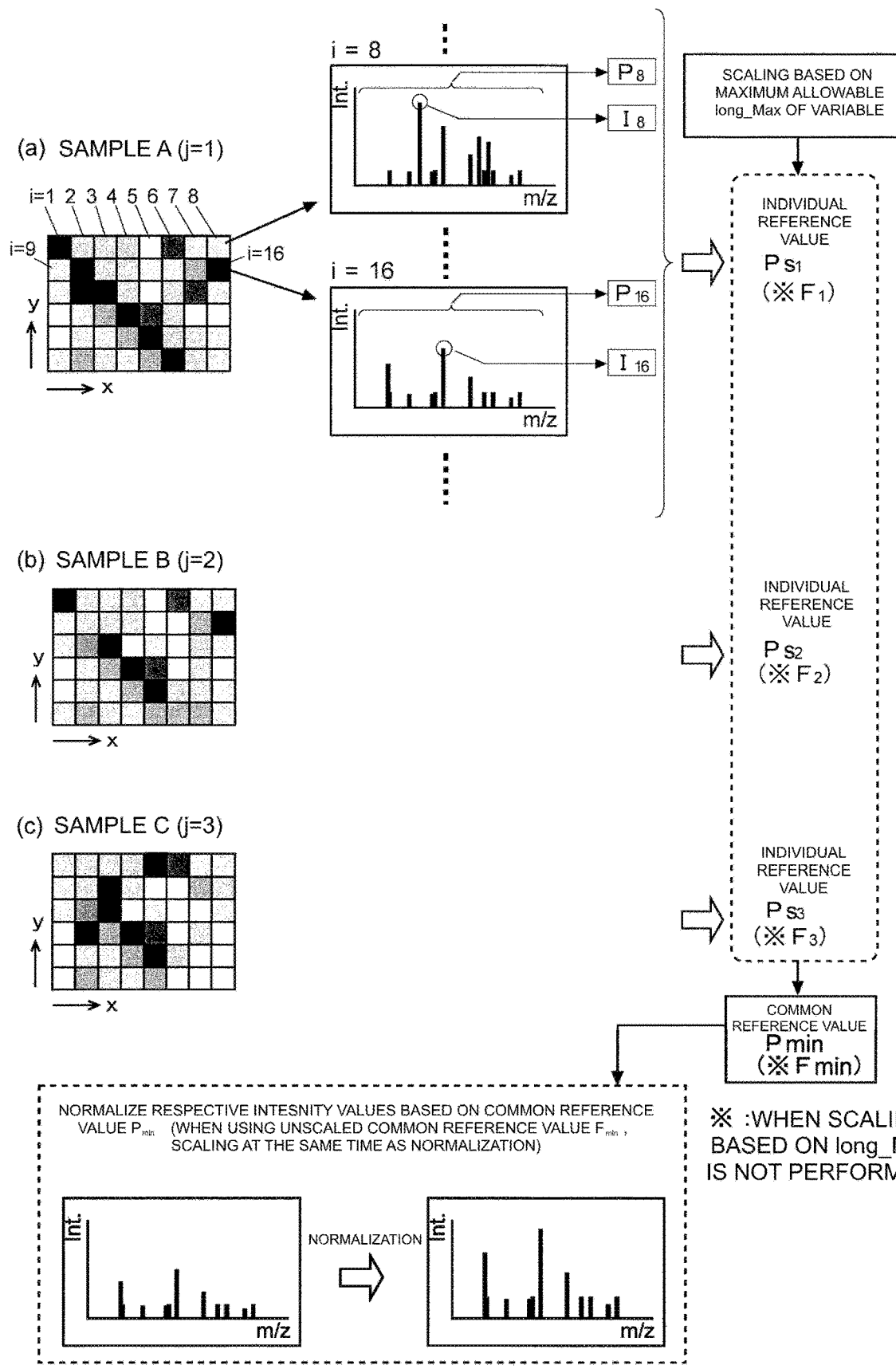
FIG. 4 is schematic explanatory drawings of the normalization processing for the plurality of imaging mass analysis data to be executed in the imaging mass analyzing device of the example.

First of all, a method of normalization processing for a plurality of the mass analysis imaging data, which is one of characteristics of the present invention, will be described with reference to FIG. 4.

Figure 5:
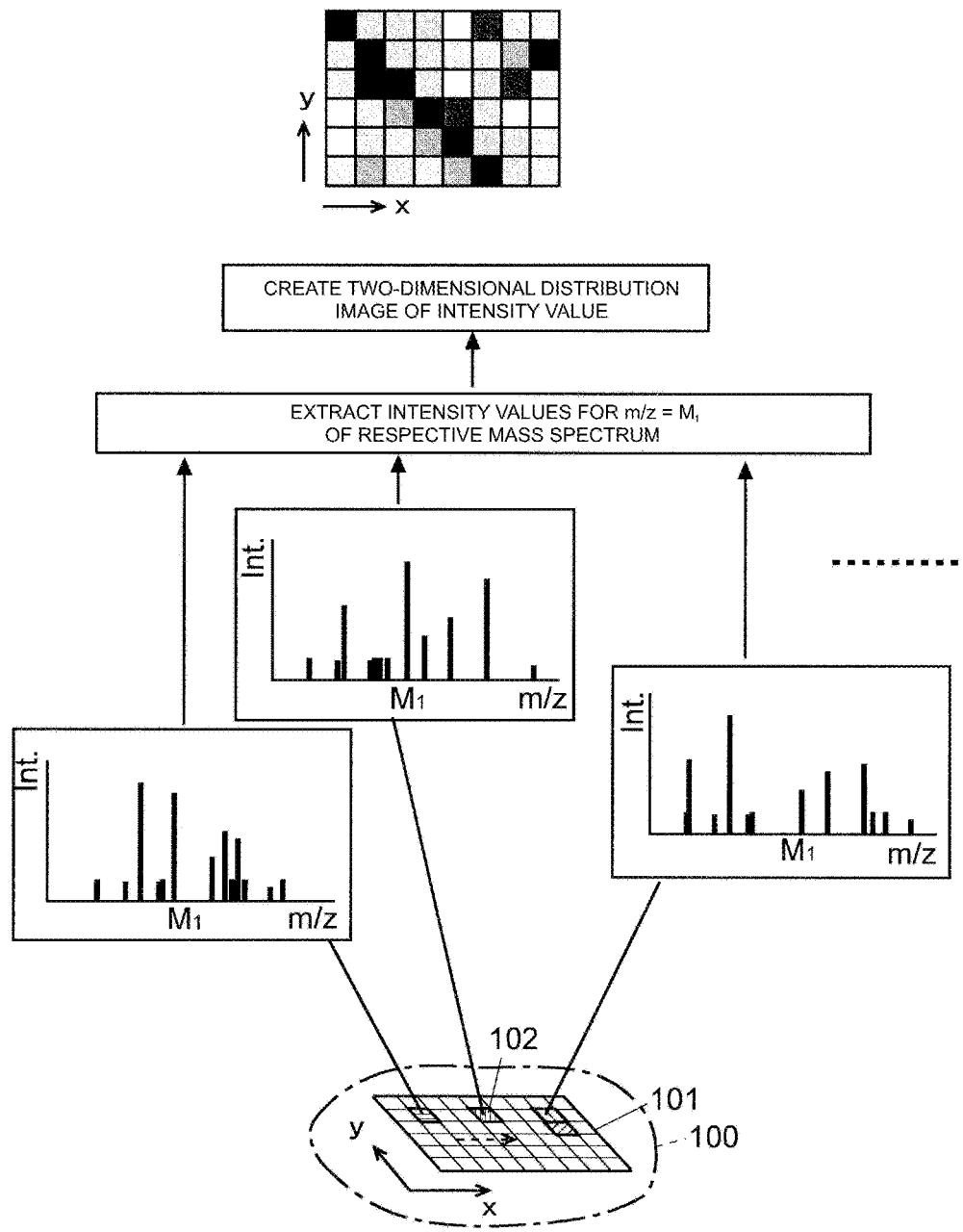
FIG. 5 is a schematic explanatory drawing illustrating data acquired by imaging mass analysis and preparation and display of a two-dimensional imaging image preparation and display based on the acquired data.

Here, a case of normalizing the mass analysis imaging data acquired from three different samples A, B, C as illustrated in FIGS. 4(a), (b), and (c) will be described as an example. As described in conjunction with FIG. 5, one mass analysis imaging data is a set of mass spectrum data in a predetermined mass charge ratio range at a number of measuring points 102 in a predetermined region to be measured 101 on a sample 100. In the three mass analysis imaging data, all the size of the measuring point (interval between measuring points), the number of measuring points, the mass charge ratio range, and mass resolution do not have to be provided.

In one mass analysis imaging data, a maximum intensity value $I_i$ in a mass spectrum at $i^{th}$ (i=1 to N, where N is a total number of the measuring points 102 in the region to be measured 101) measuring point, and $P_i$ is a TIC value, which is a sum of all intensity values on the mass spectra. $Ps_j$ is the TIC value which is a reference of normalization in the mass analysis imaging data, that is, an individual reference value. Here, j is a sequential number allocated to the mass analysis imaging data, and a sample A is assumed to be j=1, a sample B is assumed to be j=2, and a sample C is assumed to be j=3 as illustrated in FIG. 4. In addition, long_Max is a maximum allowable value that a variable storing the intensity values may take when performing arithmetic processing for normalization on a computer.

In this case, if the following expression (1) is satisfied for all the measuring points in the one mass analysis imaging data, overflow does not occur during operation of normalization.

$$I_i \times (Ps_j/P_i) \leq \text{long\_Max} \quad (1)$$

If the expression (1) is modified, $$Ps_j \leq \text{long\_Max} \times (P_i/I_i) \quad (2)$$

is satisfied.

In FIG. 4(a), mass spectra for two measuring points, i=8, i=16 are exemplified. From the former, I8 and P8 are obtained, and from the latter, I16, P16 are obtained.

When the individual reference value $Ps_j$ used in TIC normalization satisfies the expression (2), overflow does not occur at the time of normalization operation. In other words, at the time of the TIC normalization, normalization without causing overflow is achieved by performing the normalization so that a given value not larger than the maximum value from among long_Max×($P_i/I_i$) for all the i are determined to be an individual reference value $Ps_j$, and the TIC value at the respective measuring points to be equalized to the individual reference value $Ps_j$. However, if the individual reference value $Ps_j$ is too small, the round-off errors at the time of normalization operation will be increased. Therefore, the individual reference value $Ps_j$ is preferably determined to a value closer to the maximum value of long_Max×($P_i/I_i$) as much as possible. Therefore, generally, the maximum value of long_Max×($P_i/I_i$) may be determined to the individual reference value $Ps_j$. In this case, an element of long_Max is contained in the individual reference value $Ps_j$, and in normalization based thereon, it is guaranteed that no overflow occurs.

Based on the above-described expression (2), individual reference values $Ps_j$ which do not have probability of causing overflow in the normalization operation are obtained respectively for the plurality of mass analysis imaging data which are desired to be compared to each other. In the example in FIG. 4, three individual reference values $Ps_1$, $Ps_2$, and $Ps_3$ are obtained. Generally, the individual reference values $Ps_j$ are different from each other. Accordingly, the individual reference values $Ps_j$ obtained respectively for the plurality of mass analysis imaging data are compared and the one having the minimum value is selected. The selected individual reference value is determined to be a common reference value Pmin. The common reference value Pmin is determined by considering the TIC values and the maximum intensity values for all the measuring points on the plurality of mass analysis imaging data to be compared. Therefore, in all the mass analysis imaging data to be compared, the respective intensity values of the mass spectra are normalized so that the TIC values at the respective measuring points become the common reference value Pmin, and thus the plurality of mass analysis imaging data may be normalized by the same reference without causing overflow. The round-off errors generated at the time of the normalization operation may be minimized. Specifically, the intensity values may be corrected by multiplying the intensity values of the mass spectra at the respective measuring points by a normalization coefficient G which is obtained by the following expression (3).

$$G = P\text{min}/P_i \quad (3)$$

Note that although the description given above supposes a case where the TIC normalization is performed, the principle is the same also in the case where XIC normalization is performed. The reference value used for normalization is, in the case of the TIC normalization, an integrated value for the intensity value over an entire mass charge ratio range of the mass spectra, and in the XIC normalization, the intensity value in the specific mass charge ratio or the integrated value for the intensity value in the range of the specific mass charge ratio. Therefore, a common reference value may be determined based on the description given above after defining the mass charge ratio and the range thereof, and the normalization may be performed basso on the common reference value. Furthermore, the same applies in the case of normalization based on p-norm as disclosed in PTL 2, and the TIC value $P_i$ is replaced by the o-norm.

In order to perform the above-described arithmetic processing on a computer, the plurality of mass analysis imaging data to be compared are read from, for example, an external memory device into a main memory in the computer or a resister or the like in the interior of a CPU, and the maximum value of long_Max×($P_i/I_i$) is obtained for each of the mass analysis imaging data, so that an individual reference value $Ps_j$ is obtained. Then, Pmin, which is the minimum value, is obtained out of the individual reference value $Ps_j$ for the plurality of mass analysis imaging data, and based on the obtained Pmin, the respective intensity values are normalized according to the expression (3). However, the processing procedure descried above has the following problem in practice.

In other words, there is a case where the total data quantity of the mass analysis imaging data may become as much as several tens of GB as described above. Since a capacity of the main memory of the computer is limited, it is generally difficult to read all the plurality of mass analysis imaging data to be compared into the main memory when comparing the data. Therefore, the plurality of mass analysis imaging data are read into the main memory one by one and an individual reference value $Ps_j$ is obtained, and these procedures are repeated to obtain a plurality of the individual reference value $PS_j$. Then, it is necessary to select a common reference value Pmin, then read the plurality of mass analysis imaging data into the main memory one by one, and perform normalization with reference to the common reference value Pmin. In this case, a procedure of reading the same data into the main memory is required at the time of calculation of the individual reference values $PS_j$ and at the time of normalization of the respective intensity values. In other words, the operation of reading the same data is required twice, and thus data analysis needs more time.

Accordingly, in order to avoid such a problem, the processing may be performed in the following procedure. In other words, an individual reference value Psj is calculated for each of the mass analysis imaging data when collecting data by executing measurement of the sample in the imaging mass analyzing device or when performing pre-processing such as noise removal for the data to be analyzed. Subsequently, the individual reference values $Ps_j$, for example, are stored in the same data file as the mass analysis imaging data or in another data associated to the data files. When performing comparison analysis for the plurality of mass analysis imaging data, the files in which the individual reference values $Ps_j$ for the plurality of mass analysis imaging data to be compared are stored are read out, or only the individual reference values $Ps_j$ are read out from these files to determine a common reference value Pmin. Subsequently, individual mass analysis imaging data are read in the main memory and normalization with reference to the common reference value Pmin is performed. Accordingly, an operation of reading the mass analysis imaging data into the main memory for obtaining the individual reference values $Ps_j$ for normalization is no longer necessary, and time required for at least the normalization operation processing may be shortened.

Figure 1:
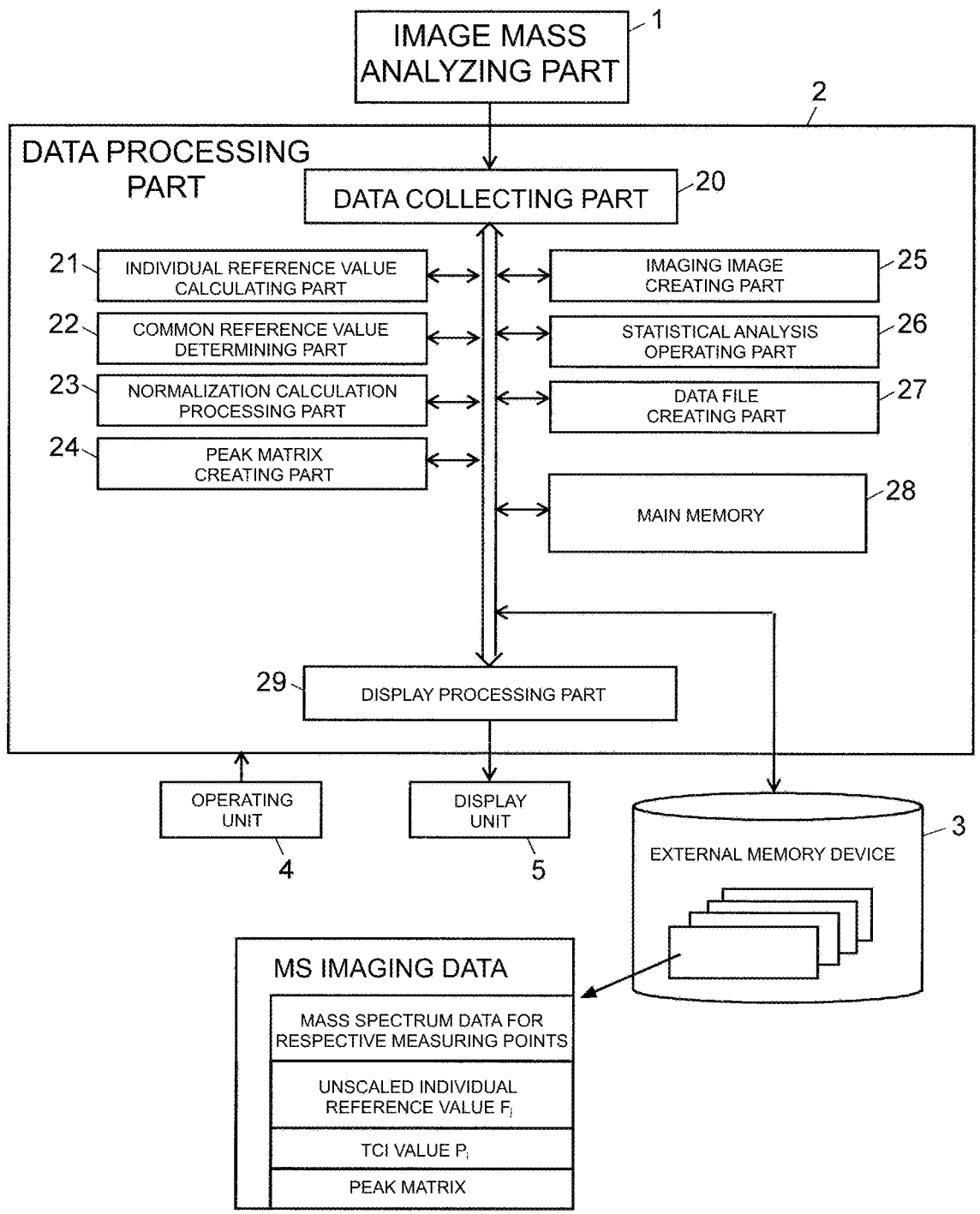
FIG. 1 is a schematic configuration drawing of illustrating an imaging mass analyzing device, which is an example of an analytical data processing apparatus of the prevent invention.

Subsequently, a configuration and an operation of an example of the imaging mass analyzing device which performs a normalization processing of the data described above will be described. FIG. 1 is a configuration drawing of a principal portion of the imaging mass analyzing device of this example.

The imaging mass analyzing device includes an imaging mass analyzing part 1, a data processing part 2 configured to execute various types of data processing as described later on the obtained data, a large-capacity external memory device 3 such as a hard disk drive (HDD) or a solid state drive (SSD) for storing the mass spectrum data acquired by the imaging mass analyzing part 1, an operating unit 4 to be operated by an analyst, and a display unit 5 configured to display results of analysis and the like.

The imaging mass analyzing part 1, although not illustrated, includes a microscopic observation part for observing optical microscopic images on a sample, and a mass analysis part including an atmospheric pressure MALDI ion source, an ion trap, and a flight time type mass spectrometer (TOFMS). The imaging mass analyzing part 1 is capable of performing mass analysis respectively for a number of measuring points (minute regions) 102 in the region to be measured 101 respectively on the sample 100 specified by the analyst to obtain mass spectrum data over a predetermined mass charge ratio range for each of the measuring points. The mass spectrum data may be MS/MS spectrum (in addition, $MS^n$ spectrum having an n value not smaller than 3) data obtained by dissociating ion corresponding to, for example, given peaks appeared on the mass spectra in the ion trap and performing mass analysis on ion generated thereby in addition to those obtained by analysis without involving ion dissociation.

The data processing part 2 may include function blocks such as a data collecting part 20, an individual reference value calculating part 21, a common reference value determining part 22, a normalization calculation processing part 23, a peak matrix creating part 24, an imaging image creating part 25, a statistical analysis 26 a data file creating part 27, a main memory 28, and a display processing part 29. The materiality of the data processing part 2 is a personal computer including a CPU, a RAM, a ROM and the like (or a work station with higher performance), and functions of the respective blocks described above except for the main memory 28 are realized by executing dedicated data analysis software installed in advance in the computer.

Figure 2:
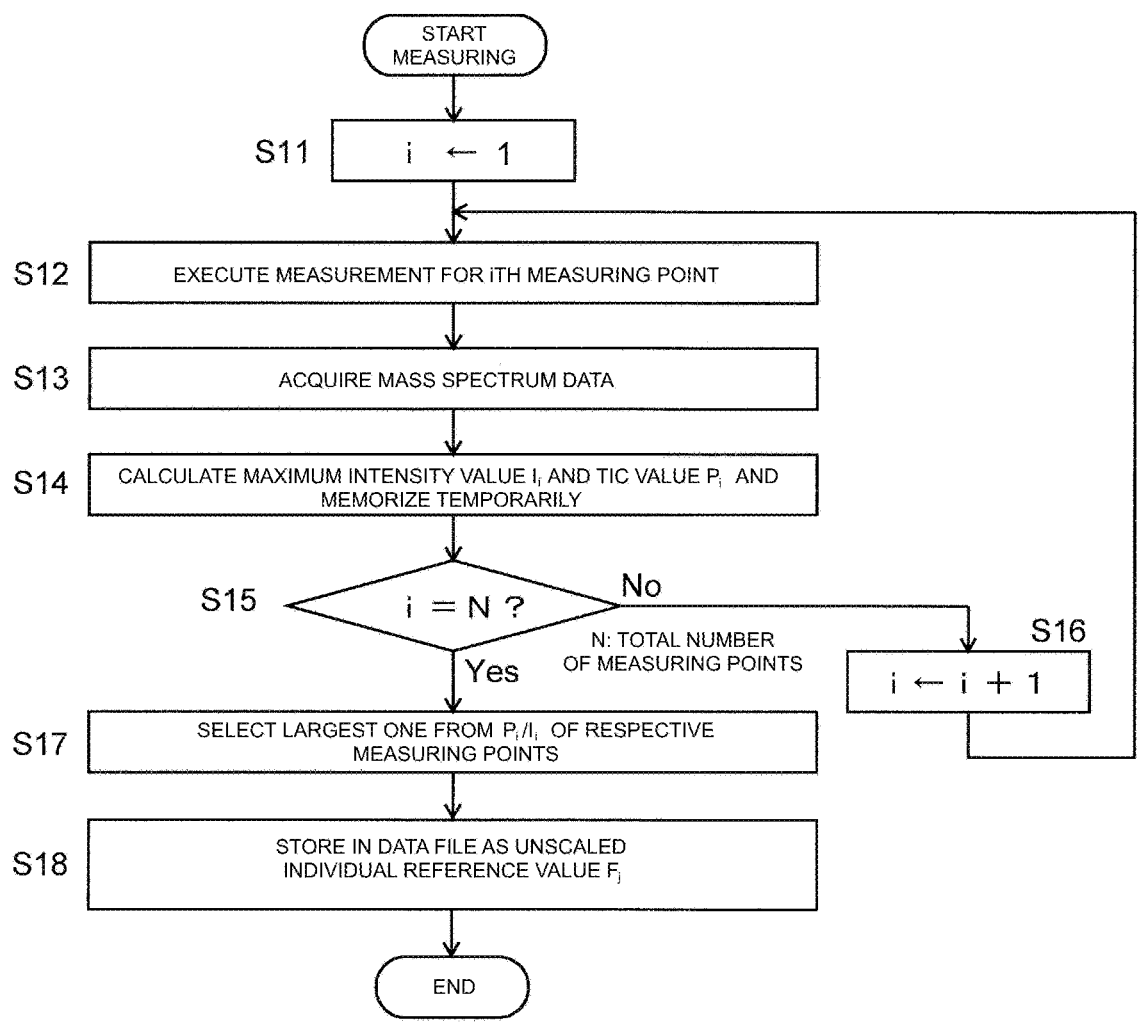
FIG. 2 is a flowchart of a data processing which is characteristic at the time of executing measurement according to an imaging mass analyzing device of the example.
Figure 3:
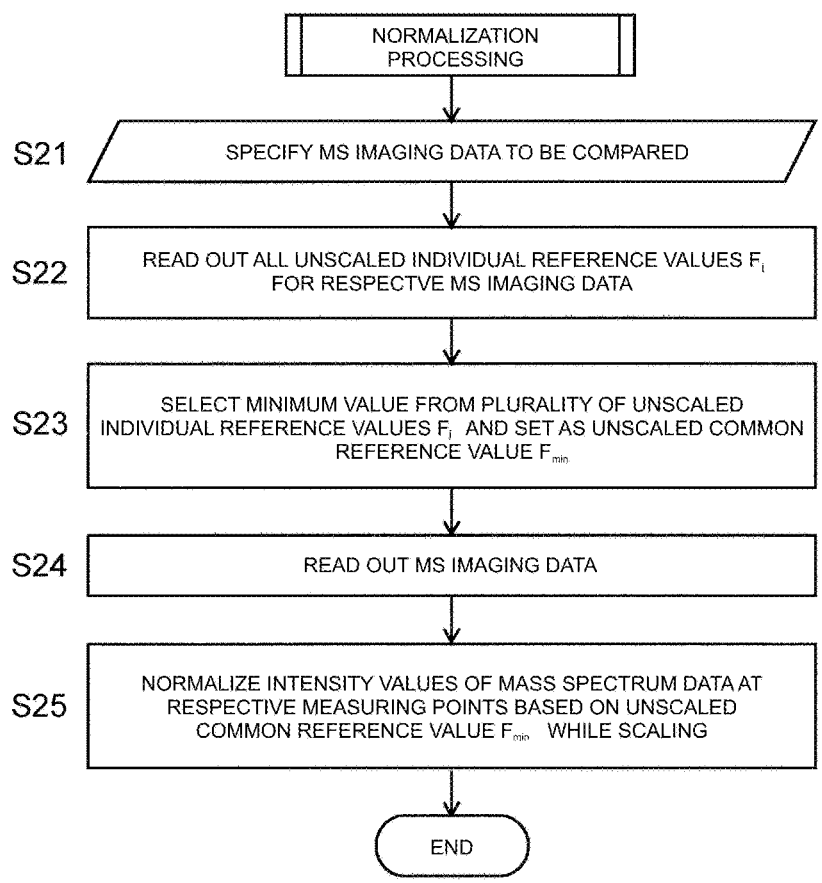
FIG. 3 is a flowchart of a normalization processing for a plurality of imaging mass analysis data in the imaging mass analyzing device of the example.

FIG. 2 is a flowchart of characteristic data processing when performing measurement on one sample in the imaging mass analyzing device of the example, and FIG. 3 is a flowchart of normalization processing for the plurality of imaging mass analysis data. The characteristic data processing operation in the imaging mass analyzing device of the example will be described with reference to these drawings.

When a sample to be measured is set in the imaging mass analyzing part 1, the microscopic observation part, not illustrated, images a high-resolution microscopic image on the sample, and the image is displayed on a screen of the display unit 5 via the data processing part 2. The analyst specifies a region to be measured on the sample by the operating unit 4 with reference to the image. Then, a control part, not illustrated, controls the imaging mass analyzing part 1 so that the mass analysis are executed in sequence for a number of the measuring points in the specified region to be measured. In other words, a variable i which specifies a measuring point is set to 1 (Step S11), and measurement for ith measuring point is executed (Step S12). Accordingly, the mass spectrum data at the ith measuring point is obtained, and thus the data collecting part 20 stores the obtained data once in the main memory 28 (Step S13).

In the data processing part 2, the individual reference value calculating part 21 calculates the largest intensity value $I_i$ and TIC value $P_i$ that is integrated with an intensity value over the entire mass charge ratio from the mass spectrum data obtained for the ith measuring point, and these values are stored therein temporarily in correspondence with the value of i (Step S14). Therefore, when i=1, the maximum intensity value $I_1$ and the TIC value $P_1$ are stored.

Subsequently, the control part determines whether or not the variable i reaches N, which is a total number of the measuring points in the region to be measured (Step S15). If the variable i does not reach a total number N of the measuring points, the value of i is incremented (Step S16) and the procedure goes back to Step S12. In contrast, if the variable i reaches the total number N of the measuring points, the procedure goes from Steps S15 to S17. Therefore, the processing from steps S12 to S16 are repeated until the variable i reaches the total number N of the measuring points. Accordingly, mass analysis for all the measuring points in the region to be measured specified by the analyst is performed, and the mass spectrum data for all the measuring points, that is, the mass analysis imaging data for the sample, are stored in the main memory 28. In contrast, the maximum intensity value $I_i$ and the TIC value $P_i$ for i=1 to N are memorized in the individual reference value calculating part 21. Subsequently, the individual reference value calculating part 21 calculates $P_i/I_i$ for all the measuring points (that is, i=1 to N), and selects the maximum value therefrom as a unsealed individual reference value $F_j$ (Step S17). The unsealed individual reference value $F_j$ is different from the above-described individual reference value $Ps_j$, and does not include an element of long_Max.

The data file creating part 27 stores the mass analysis imaging data for one sample stored in the main memory 28, the unsealed individual reference value $F_j$ obtained by the individual reference value calculating part 21, and the TIC value $P_i$ obtained at all the measuring points of i=1 to N in one data file, and the data file is stored in the external memory device 3.

Although not illustrated in FIG. 2, when multiple classification analyses such as principal component analysis (PCA), principal component regression analysis (PCR), partial least square method (PLS), hierarchical cluster analysis (HCA), hypothesis test, and support vector machine (SVM) are performed for the mass analysis imaging data, it is convenient to prepare a peak matrix based on peak information extracted from the mass spectra (the mass charge ratio value and the intensity values of peaks). Accordingly, in parallel to storage of the data obtained by measurement of the sample in the main memory 28, the peak matrix creating part 24 performs peak detection for the mass spectrum data as needed to prepare a peak matrix including the respective intensity values of the detected peaks arranged in the mass charge ratio value. Then, the data file creating part 27 may store the peak matrix in the same data file as the mass analysis imaging data.

When performing peak detection for the mass spectra, by narrowing the conditions for peak detection such as peaks having intensity values not smaller than a predetermined threshold, value, or peaks appearing in a specific range of mass charge ratio, the number of detected peaks is reduced, so that the size of the peak matrix data is reduced. Therefore, if reduction of processing time required for multivariable analysis for comparison analysis described later or data quantity to be read in the main memory 28 at the time of multivariable analysis is desired, the peak detection conditions may be narrowed as described above to be more strict to reduce the peak matrix data size.

When XIC normalization is performed instead of TIC normalization, the unsealed individual reference value may be calculated in the same manner by using the intensity values in a specific mass charge ratio in the obtained mass spectra or the integrated value for the intensity value in a specific mass charge ratio range instead of the TCI value $P_i$ and stored in the data file. The same applies to a case where normalization based on the p-norm as disclosed in PTL 2. In addition, in the case where TIC normalization and XIC normalization are desired to be performed selectively at the time of comparison analysis, or in the case where switching between the mass charge ratio value and the mass charge ratio range focused also in XIC normalization is desired, the unsealed individual reference values corresponding to the respective conditions are calculated and are stored together in the data file.

The flowchart illustrated in FIG. 2 is for a case where measurement is performed for one sample, and processing according to the flowchart illustrated in FIG. 2 is performed separately for another sample. Therefore, every time when the sample is measured, or every time when measurement for another region to be measured is performed, a data file in which the mass analysis imaging data, the unsealed individual reference value, and TIC values for the respective measuring points for the sample or the region to be measured are stored is created and is stored in the external memory device 3.

Subsequently, data processing to be executed when comparison analysis of the plurality of mass analysis imaging data is performed in a state in which data files for a plurality of samples are stored in the external memory device 3 as described above will be described with reference to FIG. 3.

In this case, the analyst specifies the plurality of mass analysis imaging data to be compared by the operating unit 4 (Step S21). FIG. 4, which has already been described, illustrates an example in which the mass analysis imaging data for the three samples A, B, C are specified. Prior to comparison analysis therefor, the common reference value determining part 22 reads out unsealed individual reference values $F_j$ from the data file stored in the external memory device 3 and corresponding to the plurality of mass analysis imaging data (Step S22). Then, the minimum value is obtained from a read plurality of unsealed individual reference values $F_j$ and is stored in the interior as an unsealed common reference value Fmin (Step S23).

Subsequently, the normalization calculation processing part 23 reads out mass analysis imaging data and TIC values $P_i$ at the respective measuring points from the data file stored in the external memory device 3 (Step S24). Then, a normalization coefficient G' is calculated from the unsealed common reference value Fmin, the TIC values $P_i$ at the respective measuring points, and the maximum allowable value long_Max of variable, which is a value specific to the apparatus according to the following expression (4), $$G'=\text{long\_Max} \times (Fmin/P_i) \quad (4).$$

Then, the intensity values of the mass spectra at the respective measuring paints included in the mass analysis imaging data is multiplied by the normalization coefficient G', so that the intensity values are corrected and stored in the main memory 28 (Step S25). In this case, being different from the description of the normalization processing method described above, the element of long_Max is not included in the unsealed individual reference value $F_j$, and as a matter of course, the element of long_Max is not included in the unsealed common reference value Fmin. However, since the element of long_Max is included in the normalization coefficient G' obtained by the expression (4), scaling is performed simultaneously so as not to cause overflow at the time of normalization operation. Therefore, the same normalization as the normalization method described above is achieved.

By multiplying the respective intensity values with the normalization coefficient G' as described above, the mass analysis imaging data having all the intensity values normalized based on the unsealed common reference value Fmin is stored in the main memory 28. Processing of Steps S24, S25 are performed for another mass analysis imaging data stored in a different data file, and the respective intensity values are normalized based on the same unsealed common reference value Fmin.

In the case where comparison of two-dimensional distributions of the ion obtained from the plurality of samples and having a specific mass charge ratio is desired, only data that indicates the intensity values at the specific mass charge ratio out of the respective mass analysis imaging data may be extracted, and the intensity values may be normalized and stored in the main memory 28. In this manner, when the plurality of mass analysis imaging data in which the intensity values are normalized under the same common reference value are prepared in the main memory 28, for example, the statistical analysis 26 performs predetermined statistical analysis based on the data in which the intensity values are normalized, and the result is output to a screen of the display unit 5 via the display processing part 29. When displaying a plurality of imaging images to be compared visually, the imaging image creating part 25 reproduces imaging images based on data stored in the main memory 28 and outputs the image onto the screen of the display unit 5 via the display processing part 29.

As described above, the peak matrix data are stored respectively in the respective data files stored in the external memory device 3, and if execution of comparison analysis of the plurality of mass analysis imaging data is desired by performing multivariable analysis such as main component analysis or the like using the peak matrix data, the normalization calculation processing part 23 may read out the peak matrix data instead of the mass spectrum data in the data files stored in the external memory device 3, and multiply the intensity values, which is respective elements in the peak matrix data, by the above-described normalization coefficient. By performing multivariable analysis using a plurality of normalized peak matrix data obtained in this manner, influence of variations in condition of measurement when measuring the plurality of samples is alleviated, so that multivariable analysis with high degree of accuracy is achieved.

As described above, by making the conditions of peak detection more strict and reducing the original size of the peak matrix data, the data quantity of the peak matrix data after normalization to be stored in the main memory 28 may be small. Therefore, an occupied capacity in the main memory 28 may be reduced, and time required for multivariable analysis is also reduced.

In the imaging mass analyzing device of this example, in parallel to execution of measurement for the sample for collecting data, an individual reference value is calculated and stored the individual reference value in the data file. However, in the case where comparison analysis between mass analysis imaging data acquired by the imaging mass analyzing device of the example and the mass analysis imaging data acquired by another apparatus is desired, the data file creased by the another apparatus may include only the mass spectrum data at the respective measuring points. In other words, the data file in which the individual reference value is not stored may be handled depending on the case.

Therefore, by using data conversion software or the like installed separately on the computer, for example, data is read in the main memory by processing by the software to detect peaks, a peak matrix is prepared and stored in a data file in which data is stored, and the individual reference value is calculated and is stored in the same data file. By creating the data file in which the peak matrix and the individual reference value are added in this manner, the processing as described in conjunction with FIG. 3 is enabled in the imaging mass analyzing device of the above-described example. As a matter of course, such a function of the data conversion software may be integrated in the data analysis software that performs the normalization processing as described above.

In the imaging mass analyzing device of the example described above, the common reference value is automatically determined based on the individual reference values determined from the respective mass analysis imaging data. However a room for determination for the analyst for setting the common reference value may also be provided. In order to do so, for example, the common reference value determining part 22 displays the plurality of unsealed individual reference value $F_j$ (or the individual reference value $Ps_j$) read from the data files on a screen of the display unit 5 via the display processing part 29 at the time of comparison analysis of the plurality of mass analysis imaging data. The analyst confirms these values and inputs, for example, a value smaller than the minimum value therein from the operating unit 4 as the common reference value. At this time, if the input value is larger than the smallest value in the plurality of individual reference values, probability of occurrence of overflow during the normalization operation remains. Therefore, a configuration in which an alarm is issued when such a value is input or an upper limit is set so as to disable such an input is also applicable. The common reference value determining part 22 sets the input value as the common reference value. Accordingly, normalization of the intensity values with reference to the value input by the analyst instead of the value automatically determined is enabled.

As described above, in the imaging mass analyzing device of the example described above, the unsealed individual reference values $F_j$ in which the element of the long_Max is not included is stored in the data files. However, since long_Max is determined specifically for the apparatus (software), the individual reference value $Ps_j$ in which the element of long_Max is included stay be obtained based on the expression (2) and may be stored in the data file as described in the description or the normalization processing method. In this case, the common reference value Pmin is obtained from the individual reference value $Ps_j$, the intensity values of the mass spectrum data at the respective measuring points may be normalized by using the normalization coefficient G obtained according to the expression (3) based on the common reference value Pmin, and scaling does not have to be performed at the time of normalization.

The example described above is an example in which the present invention is applied to processing of data obtained by the imaging mass analyzing device. However, the present invention may be applied not only to the imaging mass analyzing device, but also to various analyzing devices configured to acquire any spectrum information respectively for a number of measuring points set in the regions to be measured on samples.

For example, in the FTIR imaging device, Fourier transform infrared spectrophotometric measurement is performed on a number of measuring points in regions to be measured on samples, and infrared absorption spectra are obtained respectively. Alternatively, in the Raman spectroscopic imaging device, Raman scattering spectra is performed on a number of measuring points in a region to be measured on a sample, and Raman scattering spectra are acquired respectively. In the electron beam microanalyser or the scanning type electron microscope/energy dispersion type X-ray analyzing device, a number of measuring points in a region to be measured on a sample are irradiated with an electron beam as exciting beam, respectively, and spectra indicating relationships between energy and intensity of the characteristic X-ray emitted from the sample thereby are acquired, respectively. In the scanning-type probe microscope, a scanning probe microscope configured to measure a force acting on a probe while changing a distance between the probe and the sample at a number of measuring points on the sample and acquire spectra which indicates a relationship between a height from the surface of the sample and physical property data such a spectra (force curve) indicating a relationship between a distance between the probe and the sample and a force applied to the probe. Therefore, for example, even when comparison analysis of data obtained by these analyzing devices is performed for the plurality of samples, accurate comparison analysis is enabled by normalization of the intensity values as described above.

The example described above and various modifications described above are examples of the present invention only, and modifications, corrections, and additions performed within the scope of the present invention are included within the claims of this application, as a matter of course.

REFERENCE SIGNS LIST

1 . . . imaging mass analyzing part
2 . . . data processing part
20 . . . data collecting part
21 . . . individual reference value calculating part
22 . . . common reference value determining part
23 . . . normalization calculation processing part
24 . . . peak matrix creating part
25 . . . imaging image creating part
26 . . . statistical analysis operating part
27 . . . data file creating part
28 . . . main memory
29 . . . display processing part
3 . . . external memory device
4 . . . operating unit
5 . . . display unit
100 . . . sample
101 . . . region to be measured
102 . . . measuring point

The invention claimed is:

1. An analytical data processing method that handles a spectrum data set including spectrum data collected by performing predetermined analyses respectively on a plurality of measuring points in a predetermined region to be measured set on a sample and indicating a relationship between a predetermined parameter and a signal intensity value, being associated with spatial position information of the measuring points, the method comprising: for a plurality of the spectrum data sets different from each other obtained from an analyzing device, a) an individual reference value acquiring step for obtaining a maximum reference value at which intensity values after normalization do not exceed a predetermined allowable value when normalizing the intensity values for all or part of parameter values in spectrum data at respective measuring points for each of the spectrum data sets;

b) a common reference value selecting step for selecting a minimum reference value from a plurality of the reference values obtained in the individual reference value acquiring step as a common reference value or setting a value smaller than the minimum value as the common reference value for all the spectrum data sets; and c) a computer-implemented normalization executing step for normalizing the intensity values for all or part of the parameter values in the spectrum data contained in each of the spectrum data sets based on the common reference value selected in the common reference value selecting step, wherein normalization based on the common reference value selected in the common reference value selecting step reduces normalization operation time of said computer by avoiding overflow of data during the computer-implemented normalization executing step and minimizes round-off errors to improve accuracy of normalization of the intensity values by said computer among the different spectrum data sets.

2. The analytical data processing method according to claim 1, wherein the predetermined allowable value is a maximum possible value that a variable storing the intensity values can take when executing a normalization operation in the normalization executing step.

3. The analytical data processing method according to claim 1, wherein acquisition of the reference value for each of the spectrum data sets in the individual reference value acquiring step is performed when the spectrum data included in the spectrum data set are collected by executing the predetermined analyses for the plurality of measuring points in the predetermined region to be measured.

4. The analytical data processing method according to claim 1, wherein in the common reference value selecting step, the plurality of reference values acquired in the individual reference value acquiring step for all the spectrum data sets are presented to a user and a value according to a user instruction based on presented information is set as the common reference value.

5. The mass analytical data processing method according to claim 1, wherein the spectrum data is mass spectrum data which indicates a relationship between a mass charge ratio and an ion intensity value.

6. An analytical data processing method that handles a spectrum data set including spectrum data collected by performing predetermined analyses respectively on a plurality of measuring points in a predetermined region to be measured set on a sample and indicating a relationship between a predetermined parameter and a signal intensity value, being associated with spatial position information of the measuring points, the method comprising: for a plurality of the spectrum data sets different from each other obtained from an analyzing device, a) an individual reference value acquiring step for obtaining a value at which a ratio between an integrated value for an intensity value and a maximum intensity value for all or part of parameter values in the spectrum data at one measuring point becomes the largest among those at all the measuring points as a reference value for normalization for each of the spectrum data sets;

b) a common reference value selecting step for selecting a minimum reference value from a plurality of the reference values obtained in the individual reference value acquiring step as a common reference value or setting a value smaller than the minimum value as the common reference value for all the spectrum data sets; and c) a computer-implemented normalization executing step for normalizing the intensity values for all or part of the parameter values in the spectrum data included in each of the spectrum data sets so that the intensity values after normalization do not exceed a predetermined allowable value based on the common reference value selected in the common reference value selecting step, wherein normalization based on the common reference value selected in the common reference value selecting step reduces normalization operation time of said computer by avoiding overflow of data during the computer-implemented normalization executing step and minimizes round-off errors to improve accuracy of normalization of the intensity value by said computer among the different spectrum data sets.

7. The analytical data processing method according to claim 6, wherein the predetermined allowable value is the maximum possible value that a variable storing the intensity values can take when executing the normalization operation in the normalization executing step.

8. The analytical data processing method according to claim 6, wherein acquisition of the reference value for each of the spectrum data sets in the individual reference value acquiring step is performed when the spectrum data included in the spectrum data set is collected by executing the predetermined analyses for the plurality of measuring points in the predetermined region to be measured.

9. The analytical data processing method according to claim 6, wherein in the common reference value selecting step, a plurality of reference values acquired in the individual reference value acquiring step for all the spectrum data sets are presented to a user and a value according to a user instruction based on presented information is set as the common reference value.

10. The mass analysis analytical data processing method according to claim 6, wherein the spectrum data is mass spectrum data which indicates a relationship between a mass charge ratio and an ion intensity values.

11. An analytical data processing apparatus that handles a spectrum data set including spectrum data collected by performing predetermined analyses respectively on a plurality of measuring points in a predetermined region to be measured set on a sample and indicating a relationship between a predetermined parameter and a signal intensity value, being associated with spatial position information of the measuring points, the apparatus comprising: for a plurality of the spectrum data sets different from each other, a) an individual reference value acquiring part configured to obtain a maximum reference value at which the intensity values after a normalization do not exceed a predetermined allowable value when normalizing intensity values for all or part of parameter values in the spectrum data at the respective measuring points for each of the spectrum data sets;

b) a common reference value selecting part configured to select a minimum reference value from a plurality of the reference values obtained by the individual reference value acquiring part as a common reference value or setting a value smaller than the minimum value as the common reference value for all the spectrum data sets; and c) a normalization executing part configured to normalize the intensity values for all or part of parameter values in the spectrum data contained in each of the spectrum data sets based on the common reference value selected by the common reference value selecting part so as to avoid an overflow of data to reduce normalization operation time of the normalization executing part and to minimize round-off errors to improve accuracy of normalization of the intensity values by the normalization executing part.

12. An analytical data processing apparatus that handles a spectrum data set including spectrum data collected by performing predetermined analyses respectively on a plurality of measuring points in a predetermined region to be measured set on a sample and indicating a relationship between a predetermined parameter and a signal intensity value, being associated with spatial position information of the measuring points, the apparatus comprising: for a plurality of the spectrum data sets different from each other, a) an individual reference value acquiring part configured to obtain a value at which a ratio between an integrated value for an intensity value and a maximum intensity value for all or part of parameter values in spectrum data at one measuring point becomes the largest among those at all the measuring points as a reference value for normalization for each of the spectrum data sets;

b) a common reference value selecting part configured to select a minimum reference value from a plurality of the reference values obtained by the individual reference value acquiring part as a common reference value or setting a value smaller than the minimum value as the common reference value for all the spectrum data sets; and c) a normalization executing part configured to normalize the intensity values for all or part of the parameter values in the spectrum data included in each of the spectrum data sets so that intensity values after normalization do not exceed a predetermined allowable value based on the common reference value selected by the common reference value selecting part so as to avoid an overflow of data to reduce normalization operation time of the normalization executing part and to minimize round-off errors to improve accuracy of normalization of the intensity values by the normalization executing part.

13. An analytical data processing method that handles data including spectrum data collected by performing predetermined analyses respectively on a plurality of measuring points in a predetermined region to be measured set on a sample and indicating a relationship between a predetermined parameter and a signal intensity value, being associated with spatial position information of the measuring points, the method comprising:

a) an individual reference value acquiring step for obtaining a reference value at which intensity values after the normalization do not exceed a predetermined allowable value when normalizing the intensity values for all or part of parameter values in spectrum data at one measuring point for each of the measuring points;

b) a common reference value selecting step for selecting the minimum reference value from a plurality of the reference values for the spectrum data at the respective measuring points obtained in the individual reference value acquiring step as a common reference value or setting a value smaller than the minimum value as the common reference value; and c) a computer-implemented normalization executing step for normalizing the intensity values for all or part of the parameter values in the respective spectrum data based on the common reference value selected in the common reference value selecting step, wherein normalization based on the common reference value selected in the common reference value selecting step reduces normalization operation time of said computer by avoiding overflow of data during the computer-implemented normalization executing step and minimizes round-off errors to improve accuracy of normalization of the intensity values by said computer.

14. An analytical data processing apparatus that handles data including spectrum data collected by performing predetermined analyses respectively on a plurality of measuring points in a predetermined region to be measured set on a sample and indicating a relationship between a predetermined parameter and a signal intensity value, being associated with spatial position information of the measuring points, the apparatus comprising:

a) an individual reference value acquiring part configured to obtain a reference value at which intensity values after the normalization do not exceed a predetermined allowable value when normalizing the intensity values for all or part of parameter values in spectrum data at one measuring point for each of the measuring points;

b) a common reference value selecting part configured to select the minimum reference value from the plurality of reference values for the spectrum data at the respective measuring points obtained in the individual reference value acquiring part as a common reference value or setting a value smaller than the minimum value as the common reference value; and c) a normalization executing part configured to normalize the intensity values for all or part of the parameter values in the respective spectrum data based on the common reference value selected by the common reference value selecting part so as to avoid an overflow of data to reduce normalization operation time of the normalization executing part and to minimize round-off errors to improve accuracy of normalization of the intensity values by the normalization executing part.

15. An analytical data processing method that handles data including spectrum data collected by performing predetermined analyses respectively on a plurality of measuring points in a predetermined region to be measured set on a sample and indicating a relationship between a predetermined parameter and a signal intensity value, being associated with spatial position information of the measuring points, the method comprising:

a) an individual reference value acquiring step for obtaining a value at which a ratio between an integrated value for the intensity value and the maximum intensity value for all or part of the parameter values in a spectrum data at one measuring point becomes the largest among those at all the measuring points as a reference value for normalization for each of the measuring points;

b) a common reference value selecting step for selecting the minimum reference value from the plurality of reference values for the spectrum data at the respective measuring points obtained in the individual reference value acquiring step as a common reference value or setting a value smaller than the minimum value as the common reference value; and c) a computer-implemented normalization executing step for normalizing intensity values for all or part of the parameter values in the respective spectrum data so that intensity values after normalization do not exceed a predetermined allowable value based on the common reference value selected in the common reference value selecting step, wherein normalization based on the common reference value selected in the common reference value selecting step reduces normalization operation time of said computer by avoiding overflow of data during the computer-implemented normalization executing step and minimizes round-off errors to improve accuracy of normalization of the intensity values by said computer.

16. An analytical data processing apparatus that handles a data including spectrum data collected by performing predetermined analyses respectively on a plurality of measuring points in a predetermined region to be measured set on a sample and indicating a relationship between a predetermined parameter and a signal intensity value, being associated with spatial position information of the measuring points, the apparatus comprising:

a) an individual reference value acquiring part configured to obtain a value at which a ratio between an integrated value for the intensity value and the maximum intensity value for all or part of the parameter values in a spectrum data at one measuring point becomes the largest among those at all the measuring points as a reference value for normalization for each of the measuring points;

b) a common reference value selecting part configured to select the minimum reference value from a plurality of reference values for the spectrum data at the respective measuring points obtained in the individual reference value acquiring part as a common reference value or setting a value smaller than the minimum value as the common reference value; and c) a normalization executing part configured to normalize the intensity values for all or part of the parameter values in the respective spectrum data so that intensity values after normalization do not exceed a predetermined allowable value based on the common reference value selected in the common reference value selecting part so as to avoid an overflow of data to reduce normalization operation time of the normalization executing part and to minimize round-off errors to improve accuracy of normalization of the intensity values by the normalization executing part.

* * * * *